(12) United States Patent
Setlur et al.

(10) Patent No.: US 12,448,336 B2
(45) Date of Patent: Oct. 21, 2025

(54) BOND COAT INCLUDING METAL OXIDES AND OXYGEN GETTERS (71) Applicant: General Electric Company, Schenectady, NY (US)

(72) Inventors: Anant Achyut Setlur, Niskayuna, NY (US); Julin Wan, Rexford, NY (US)

(73) Assignee: General Electric Company, Evendale, OH (US)

( * ) Notice: Subject to any disclaimer, the term of this patent is extended or adjusted under 35 U.S.C. 154(b) by 723 days.

(21) Appl. No.: 17/665,915

(22) Filed: Feb. 7, 2022

(65) Prior Publication Data

US 2023/0250032 A1 Aug. 10, 2023

(51) Int. Cl.
C04B 41/50 (2006.01)

(52) U.S. Cl.
CPC ...... C04B 41/5027 (2013.01); C04B 41/5096 (2013.01)

(58) Field of Classification Search
None
See application file for complete search history.

(56) References Cited

U.S. PATENT DOCUMENTS

| | | | |
|---|---|---|---|
| 6,159,553 A | 12/2000 | Li et al. | |
| 9,005,717 B2 | 4/2015 | Kirby et al. | |
| 9,056,802 B2 | 6/2015 | Kirby et al. | |
| 9,133,541 B2 * | 9/2015 | Lee | C04B 41/52 |
| 9,890,089 B2 | 2/2018 | Kirby et al. | |
| 10,807,912 B1 | 10/2020 | Zhu et al. | |
| 10,858,725 B2 * | 12/2020 | Li | F01D 25/005 |
| 11,072,566 B2 | 7/2021 | Kirby et al. | |
| 2006/0099358 A1 | 5/2006 | Raybould et al. | |
| 2008/0145643 A1 | 6/2008 | Reynolds et al. | |
| 2009/0162632 A1 | 6/2009 | Kirby et al. | |
| 2009/0220776 A1 | 9/2009 | Meschter et al. | |
| 2009/0274850 A1 | 11/2009 | Bhatia et al. | |
| 2009/0297118 A1 | 12/2009 | Fink et al. | |
| 2010/0129636 A1 | 5/2010 | Cybulsky et al. | |

(Continued)

FOREIGN PATENT DOCUMENTS

| | | |
|---|---|---|
| EP | 1764351 A2 | 3/2007 |
| EP | 2284137 A2 | 2/2011 |

(Continued)

OTHER PUBLICATIONS

Fernandez-Carrion et al., Solid solubility of $Yb_2Si_2O_7$ in $\beta$-, $\gamma$- and $\delta$-$Y_2Si_2O_7$, Journal of Solid State Chemistry, vol. 184, Issue 7, Jul. 2011, pp. 1882-1889. DOI:10.1016/j.jssc.2011.05.034.

(Continued)

*Primary Examiner* — Danielle M. Christensen
(74) *Attorney, Agent, or Firm* — Dority & Manning, P.A.

(57) ABSTRACT

Coated components and their methods of formation are provided. The coated component includes: a ceramic matrix composite substrate comprising silicon carbide and having a surface; a bond coat on the surface of the substrate; and an environmental barrier coating on the bond coat. The bond coat includes a plurality of discrete particles dispersed within a matrix phase that includes mullite. The plurality of discrete particles includes an oxygen getter and a transition metal oxide.

20 Claims, 6 Drawing Sheets

(56) References Cited

U.S. PATENT DOCUMENTS

| | | |
|---|---|---|
| 2010/0129673 A1 | 5/2010 | Lee |
| 2010/0154422 A1 | 6/2010 | Kirby et al. |
| 2010/0159151 A1 | 6/2010 | Kirby et al. |
| 2010/0255260 A1 | 10/2010 | Lee et al. |
| 2011/0027470 A1 | 2/2011 | Kirby et al. |
| 2011/0203281 A1 | 8/2011 | Sarrafi-Nour et al. |
| 2011/0217511 A1 | 9/2011 | Kirby et al. |
| 2013/0089673 A1 | 4/2013 | Kirby et al. |
| 2013/0122259 A1 | 5/2013 | Lee |
| 2013/0136915 A1 | 5/2013 | Naik |
| 2013/0344319 A1 | 12/2013 | Zhu et al. |
| 2014/0072816 A1 | 3/2014 | Lee |
| 2014/0199163 A1 | 7/2014 | Lee |
| 2014/0261080 A1 | 9/2014 | Lee |
| 2014/0272197 A1 | 9/2014 | Lee |
| 2015/0267058 A1 | 9/2015 | Lee |
| 2020/0199031 A1* | 6/2020 | Luthra ............... C04B 41/5031 |

FOREIGN PATENT DOCUMENTS

| | | |
|---|---|---|
| EP | 2289863 A2 | 3/2011 |
| WO | WO2011/137244 A1 | 11/2011 |
| WO | WO2012/027442 A1 | 3/2012 |
| WO | WO2014/007901 A2 | 1/2014 |
| WO | WO2018052741 A1 | 3/2018 |

OTHER PUBLICATIONS

Herrmann et al, Rare Earth (RE: Nd, Dy, Ho, Y, Yb, and Sc) Aluminosilicates for Joining Silicon Carbide Components, International Journal of Applied Ceramic Technology, vol. 14, Issue 4, Jul./Aug. 2017, pp. 675-691. (Abstract Only) https://doi.org/10.1111/ijac.12692.

Lee et al., Development of Oxide-Based High Temperature Environmental Barrier Coatings for Ceramic Matrix Composites via the Slurry Process, Journal of the European Ceramic Society, vol. 41, 2021, pp. 1639-1653.

Lee et al., Rare Earth Silicate Environmental Barrier Coatings for SiC/SiC Composites and Si3N4 Ceramics, Journal of the European Ceramic Society, vol. 24, Issue 10, Jan. 2005, pp. 1705-1715.

Lim et al., Low Temperature Sintering Additives for Mullite Ceramics, Journal Korean Ceram Soc, vol. 48, Issue 6, 2011. (Abstract Only) https://doi.org/10.4191/kcers.2011.48.6.604.

Mechnich et al., Accelerated Reaction Bonding of Mullite, Journal of the American Ceramic Society, vol. 81, Issue 7, Jul. 1998, pp. 1931-1937. (Abstract Only) https://doi.org/10.1111/j.1151-2916.1998.tb02569.x.

Mechnich et al., Reaction Bonding of Mullite (RBM) in Presence of Scandia Sc2O3, Society, vol. 28, Issue 2, 2008, pp. 473-478. (Abstract Only) https://doi.org/10.1016/i.jeurceramsoc.2007.03.010.

Nakayama et al., Evaluation of Environmental Barrier Coatings for SiC/SiC Composites, Advanced Ceramic Coatings and Interfaces: Ceramic Engineering and Science Proceedings, vol. 27, Chapter 15, 2006, pp. 161-170. (Abstract Only) https://doi.org/10.1002/9780470291320.ch15US98900892B2.

Tripathi et al., Synthesis and Mechanical Properties of Mullite from Beach Sand Sillimanite: Effect of TiO2, Journal of the European Ceramic Society, vol. 18, No. 14, 1998, pp. 2081-2087.

Xu et al., Investigation on the Preparation of Si/mullite/Yb2Si2O7 Environmental Barrier Coatings onto Silicon Carbide, Journal of Rare Earths, vol. 28, No. 3, 2010, pp. 399-402. (Abstract Only).

Zhu et al., Defect Clustering and Nano-Phase Structure Characterization of Multi-Component Rare Earth Oxide Doped Zirconia-Yttria Thermal Barrier Coatings, Ceramic Engineering and Science Proceedings, vol. 24, Issue 3, 2003, pp. 525-534. (Abstract Only).

* cited by examiner

BOND COAT INCLUDING METAL OXIDES AND OXYGEN GETTERS

FIELD

The present invention generally relates to bond coats for use with environmental barrier coatings on ceramic components, particularly silicon-based ceramic matrix components, along with methods of their formation and use.

BACKGROUND

Higher operating temperatures for gas turbine engines are continuously being sought in order to improve their efficiency. However, as operating temperatures increase, the high temperature durability of the components of the engine must correspondingly increase. Significant advances in high temperature capabilities have been achieved through the formulation of iron, nickel, and cobalt-based superalloys. Still, with many hot gas path components constructed from super alloys, thermal barrier coatings (TBCs) can be utilized to insulate the components and can sustain an appreciable temperature difference between the load-bearing alloys and the coating surface, thus limiting the thermal exposure of the structural component.

While superalloys have found wide use for components used throughout gas turbine engines, and especially in the higher temperature sections, alternative lighter-weight substrate materials have been proposed, such as ceramic matrix composite (CMC) materials, in particular silicon carbide (SiC) fiber reinforced SiC and SiC—Si matrix composites, so called SiC/SiC composites. CMC and monolithic ceramic components can be coated with environmental barrier coatings (EBCs) to protect them from the harsh environment of high temperature engine sections. EBCs can provide a dense, hermetic seal against the corrosive gases in the hot combustion environment.

Silicon carbide and silicon nitride ceramics undergo oxidation in dry, high temperature environments. This oxidation produces a passive, silicon oxide scale on the surface of the material. In moist, high temperature environments containing water vapor, such as a turbine engine, both oxidation and recession occurs due to the formation of a passive silicon oxide scale and subsequent conversion of the silicon oxide to gaseous silicon hydroxide. To prevent recession in moist, high temperature environments, environmental barrier coatings (EBC's) are deposited onto silicon carbide and silicon nitride materials.

Currently, EBC materials are made out of rare earth silicate compounds. These materials seal out water vapor, preventing it from reaching the silicon oxide scale on the silicon carbide or silicon nitride surface, thereby preventing recession. Such materials cannot prevent oxygen penetration, however, which results in oxidation of the underlying substrate. Oxidation of the substrate yields a passive silicon oxide scale, along with the release of carbonaceous or nitrous oxide gas. The carbonaceous (i.e., CO, $CO_2$) or nitrous (i.e., NO, $NO_2$, etc.) oxide gases cannot escape out through the dense EBC and thus, blisters form, which can cause spallation of the EBC. The use of a silicon bond coat has been the solution to this blistering problem to date. The silicon bond coat provides a layer that oxidizes (forming a passive silicon oxide layer beneath the EBC) without liberating a gaseous by-product.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which.

Repeat use of reference characters in the present specification and drawings is intended to represent the same or analogous features or elements of the present invention.

Definitions

As used herein, the terms "first", "second", and "third" may be used interchangeably to distinguish one component from another and are not intended to signify location or importance of the individual components.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth. As used herein, "RE" refers to a rare earth element or a mixture of rare earth elements. More specifically, the "RE" refers to the rare earth elements of scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), or mixtures thereof.

As used herein, "alumina" refers to an aluminum oxide in the form of $Al_2O_3$.

As used herein, "silica" refers to a silicon oxide in the form of $SiO_2$.

Conversely, "elemental silicon" refers to silicon without any alloying materials present, outside of incidental impurities. It is sometimes referred to in the art as "silicon metal." Elemental silicon has a melting point of about 1414° C.

As used herein, the term "mullite" generally refers to a mineral containing alumina and silica. That is, mullite is a chemical compound of alumina and silica with an alumina ($Al_2O_3$) and silica ($SiO_2$) ratio of about 3 to 2 (e.g., within 10 mole % of 3 to 2 of alumina to silica). However, a ratio of about 2 to 1 has also been reported as mullite (e.g., within 10 mole % of 2 to 1 of alumina to silica).

As used herein, a "transition metal" refers to a metallic element of Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, Hg, and the lanthanides (La, Ce, Pr, Nd, Pm, Sm, Eu, Gd, Tb, Dy, Ho, Er, Tm, Yb, and Lu).

As used herein, the term "substantially free" is understood to mean completely free of said constituent, or inclusive of trace amounts of same. "Trace amounts" are those quantitative levels of chemical constituent that are barely detectable and provide no benefit to the functional or aesthetic properties of the subject composition. The term "substantially free" also encompasses completely free.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

The presence of a silicon bond coat limits the upper temperature of operation for the EBC because the melting point of silicon metal is relatively low, at about 1414° C. Above these melting temperatures, the silicon bond coat may delaminate from the underlying substrate, effectively removing the bond coat and the EBC thereon. Recently, high temperature EBCs have been contemplated that utilize a bond coat containing silicon particles as an oxygen getter.

However, these high temperature EBCs have shown a weakness in intermediate temperature ranges. In particular, it is desired that the bond coat prevents both water and oxygen permeation to the underlying substrate at temperatures of 650° C. to 1500° C. For prevention of water permeation, it is desired to minimize or remove any open porosity in the bond coat. As such, it is desirable to have improved bond coats in the EBC to achieve a higher operational temperature limit for the EBC while remaining effective in lower and intermediate temperatures.

In principle, liquid phase sintering of a mullite layer could lead to a dense mullite layer. However, residual liquid phase in this layer could lead to high oxidant permeability paths in the mullite that essentially negate the benefits of higher density. Methods and coatings described herein address appropriate composition selection that may lead to mullite densification through liquid-phase sintering but without incurring a significant penalty in high and low temperature oxidation life. Thus, methods and coatings described herein may prevent water permeation by removing open porosity in the EBC through the formation of a dense mullite layer without incurring a significant penalty in high and low temperature oxidation life.

A coated component is generally provided that includes a bond coat containing a matrix phase having a plurality of discrete particles dispersed therein, along with methods of its formation and use. Generally, the plurality of discrete particles comprises an oxygen getter and a transition metal oxide. Without wishing to be bound by any particular theory, the presence of the transition metal oxide aids in mullite densification through liquid-phase sintering but without incurring a significant penalty in high and low temperature oxidation life. For example, methods disclosed herein may result in the removal of open porosity in the bond coat through the formation of a dense mullite layer. In one embodiment, the transition metal oxide adds specific dopant chemistries to the bond coat that induces liquid phase sintering at sintering temperatures (e.g., 1475° C. to 1565° C.) but do not lead to significant debit in oxidation life.

Figure 1:
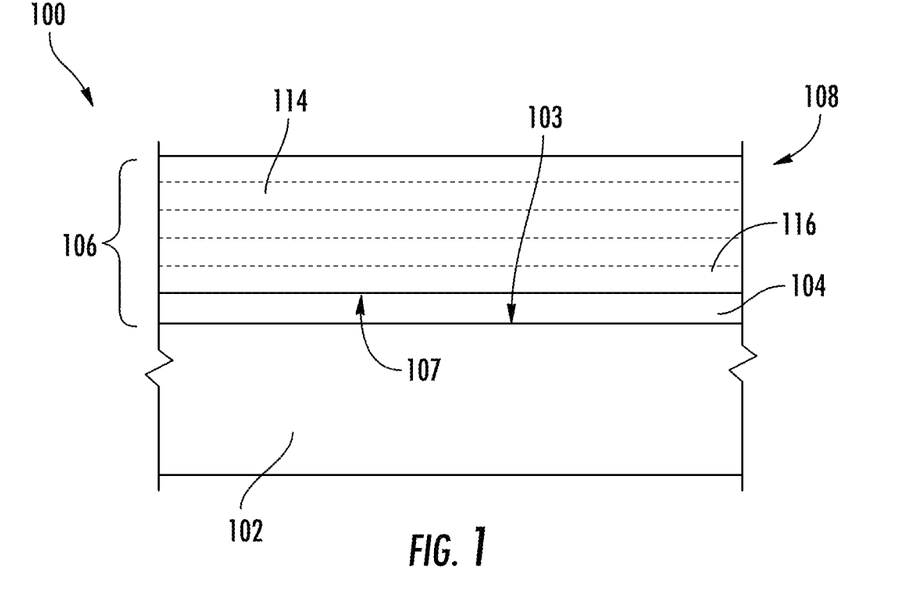
FIG. 1 is a cross-sectional schematic view of an exemplary coated component including a bond coat and an EBC thereon.

The bond coat containing mullite and including the discrete particles is, in one particular embodiment, generally positioned between the surface of the substrate and an environmental barrier coating (EBC) thereon. Referring to FIG. 1, an exemplary coated component 100 is shown formed from a substrate 102 having a surface 103 with a coating system 106 thereon. Generally, the coating system 106 includes a bond coat 104 on the surface 103 of the substrate, and an EBC 108 on the bond coat 104. In the embodiment shown, the bond coat 104 is directly on the surface 103 without any layer therebetween.

Figure 2:
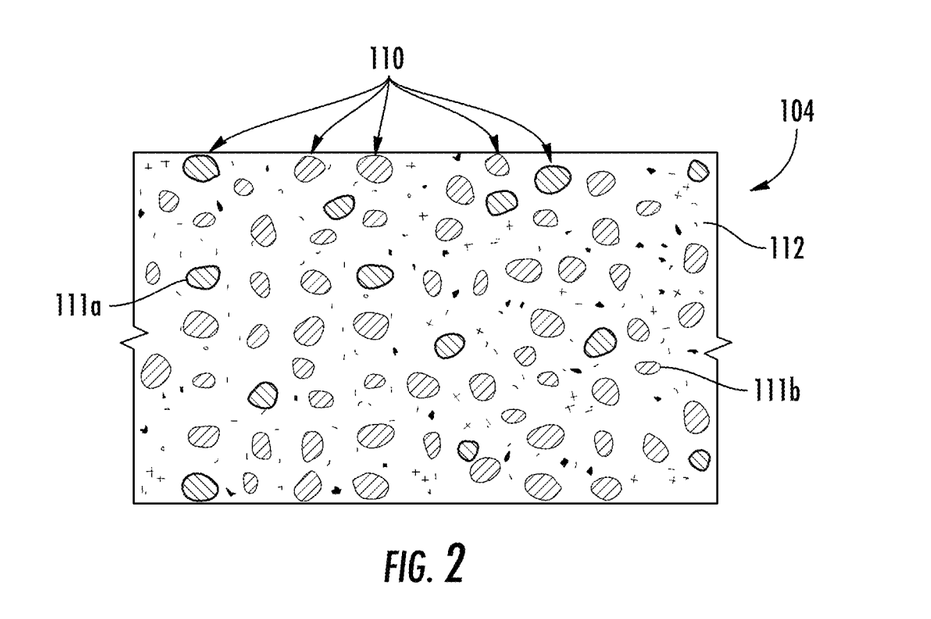
FIG. 2 is a cross-sectional side view of an exemplary bond coat formed from a matrix having a plurality of discrete particles, including first discrete particles and second discrete particles, dispersed therein.

In the exemplary embodiment of FIG. 2, the bond coat 104 is shown having a matrix phase 112 with a plurality of discrete particles 110 dispersed therein. Generally, the plurality of discrete particles 110 include an oxygen getter and a transition metal oxide, corresponding respectively to first discrete particles 111a and second discrete particles 111b. Although shown as separate discrete particles 111a and 111b, the oxygen getter and a transition metal oxide may form a mixed particle in certain embodiments. In the embodiment shown, the matrix phase 112 forms a continuous phase of the bond coat 104. Additionally, in the embodiment shown in FIG. 1, the matrix phase 112 spans the thickness of the bond coat 104 and is bonded directly to the surface 103 of the substrate 102 and to an inner surface 107 of the EBC 108.

Generally, the first discrete particles 111a of the plurality of discrete particles 110 comprises an oxygen getter configured to react with oxygen during use of the component and densify the coating during processing, so as to inhibit oxygen from reaching the underlying surface 103 of the substrate 102. The second discrete particles 111b of the discrete particles 110 of the bond coat include a transition metal oxide. In most embodiments, the oxygen getter and the transition metal oxide form different particles (i.e., first discrete particles 111a and second discrete particles 111b). However, in other embodiments, the oxygen getter and the transition metal oxide form composite particles within the matrix phase 112.

The transition metal oxide is generally a transition metal oxide ($TM_xO_y$, where TM is a transition metal and x,y are integers that balance the valance of the oxide). In one particular embodiment, the transition metal oxide is resistant to chemical reduction to its metallic form (e.g., elemental transition metal), particularly when in proximity to Si within the $Al_2O_3$—$SiO_2$-$TM_xO_y$ phase diagram. Generally, any lanthanide oxide has the potential to be a liquid phase sintering aid, but it is believed that the highest temperature eutectic compositions within the $Al_2O_3$—$SiO_2$-$TM_xO_y$ phase diagram are particularly suitable. For example, particularly suitable transition metal oxides may include, but are not limited to, $Y_2O_3$, $Lu_2O_3$, $Sc_2O_3$, $TiO_2$, $Ta_2O_5$, $La_2O_3$, $CeO_2$, or mixtures thereof.

The transition metal oxide may be in the form of the elemental oxide or alternately in the form of an aluminate-transition metal oxide complex or silicate-transition metal oxide complex. In one particular embodiment, for example, the transition metal oxide may be included in aluminate formed of an aluminum oxide and the transition metal oxide (e.g., $Al_2O_3$-$TM_xO_y$) to form an aluminate-transition metal oxide complex. In such an embodiment, the additional aluminum oxide may sinter with the mullite to form an aluminum-rich mullite composition. For example, the excess $Al_2O_3$ may also form an aluminum oxide (e.g., $Al_2O_3$) phase within the mullite. Without wishing to be bound by any particular theory, it is believed that having an excess aluminum oxide may help slow initial oxidation of the oxygen getter, especially processing of the bond coat and the overlying EBC layers. Additionally, it is believed that the silicon oxide and the transition metal oxide complexed together may lead to improved reaction kinetics.

The oxygen getter and the transition metal oxide may be included within the bond coat at relative amounts that are sufficient to inhibit oxygen from reaching the underlying surface, keep the bond coat with relatively low porosity, and/or maintain the structural integrity of the bond coat even at relatively high temperatures. In certain embodiments, the oxygen getter can be included in the bond coat of 1% by weight to 30% by weight, such as 1% by weight to 10% by weight. In certain embodiments, the transition metal oxides can be included in the bond coat of 0.1% by weight to 10% by weight, such as 1% by weight to 5% by weight. For instance, the transition metal oxides can be included in the bond coat from 0.1 mol % to 10 mol % of the matrix material, such as 0.5 mol % to 5 mol %.

In one embodiment, the oxygen getter comprises silicon, such as elemental silicon. For example, the oxygen getter may consist essentially of silicon (at the time of the bond coat's formation) such that at least 95% by weight of the oxygen getter is silicon (prior to exposure to any oxygen), such as at least 99% by weight of the oxygen getter.

In one particular embodiment, the bond coat 104 may be formed from a mixture of the transition metal oxide and elemental silicon (together as the discrete particles 110) contained within the matrix phase 112. As explained in greater detail below, the elemental silicon within the mullite may melt during operation of the coated component, while remaining contained within the matrix phase and while keeping the functions of the bond coat 104. Such functions of the bond coat 104 may include, but are not limited to, bonding the substrate to the EBC thereon and gettering of oxygen without releasing gas to prevent oxidation of the underlying substrate that would otherwise result in a gaseous by-product. Thus, liquid discrete particles may be utilized within the bond coat 104 during operation of the coating component (e.g., within a gas turbine engine). Since the bond coat 104 continues to function above the melting point of the discrete particles, the coated component can be operated at temperatures above the melting point of the discrete particles.

Although silicon does not oxidize to form a gas like CO from SiC, it does form silicon hydroxides gaseous species when in contact with water vapor. However, the partial pressures of the silicon hydroxides gaseous species are sufficiently low so that they do not significantly form gas bubbles. Moreover, these partial pressures inhibit recession unless there are interconnected pores to the outside gas surface. The density of the mullite matrix and the hermeticity of the upper layers of the EBC may be controlled to minimize the formation of silicon hydroxide.

In one embodiment, the discrete particles are generally coarse so as to have a large enough size such that the oxidation reaction thereof occurs relatively slowly through the bond coat's thickness. Without wishing to be bound by any particular theory, it is believed that the oxidation occurs on only a thin surface layer of the relatively coarse particles, effectively slowing the oxidation of the discrete particles compared to finer particles. As such, the presence of the relatively coarse particles may create a stress state that is more manageable compared to finer particles, thus leading to less cracking tendency. Additionally, oxidation of the relatively coarse particles may create a diffuse reaction zone within the thickness of the bond coat, instead of a sharp reaction front that may be seen with smaller particles. In addition, the discrete particles are subject to oxidation or evaporation during manufacturing process of the coating. Coarse particles provide the advantage of slowing down such degradation and thus may help maintain a desired proportion of particles in the bond coat.

As stated above, the plurality of discrete particle has a relatively large size (i.e., coarse particles) such that an oxidation reaction of the oxygen getter occurs relatively slowly through the bond coat's thickness. However, if the discrete particles 110 are too large in size and/or too much in content, the discrete particles may form a continuous phase in use at temperatures where the oxygen getter liquifies (e.g., above 1414° C. when comprising silicon). Too much continuous phase (formed by the liquified too large discrete particles) could lead to spallation of the coating.

For example, the plurality of discrete particle has 50% of its volume or greater (e.g., 75% of its volume or greater) formed from particles having an average size of 10 μm to 100 μm. In one embodiment, the plurality of discrete particle has 50% of its volume or greater (e.g., 75% of its volume or greater) formed from particles having an average size of 20 μm to 75 μm. In one particular embodiment, the plurality of discrete particle has 50% of its volume or greater (e.g., 75% of its volume or greater) formed from particles having an average size of 30 μm to 50 μm. Thus, without wishing to be bound by any particular theory, it is believed that the presence of these relatively large particles slows the oxidation reaction to create a diffuse reaction zone, leading to reduced stress due to expansion and inhibiting cracking.

No matter the configuration of the bond coat 104, the discrete particles 110 are contained, upon melting of the oxygen getter, within the matrix phase 112 between the surface 103 of the substrate 102 and an inner surface 107 of the environmental barrier coating 108. That is, the matrix phase 112 may form a 3-dimensional network that spans the thickness of the bond coat 104 and is bonded to the surface 103 of the substrate 102 and to the inner surface 107 of the environmental barrier coating 108. As such, the matrix phase 112 works with the surface 103 of the substrate 102 and the environmental barrier coating 108 to contain the melted oxygen getter therein while keeping the integrity of the bond coat 104 without delamination from the surface 103 of the substrate 102.

Thus, the matrix phase 112 is included in the bond coat 104 in an amount to provide structural integrity to the bond coat 104 while the oxygen getter of the discrete particles 110 is melted at operating temperatures, such as above the melting point of elemental silicon (i.e., about 1414° C.) when the oxygen getter is silicon, while incorporating sufficient amounts of the oxygen getter therein. The matrix phase 112 also functions to limit the diffusion of oxidants, namely oxygen or water vapor, to reach the discrete particles 110. In one embodiment, the matrix phase may define at least 60% by volume of the bond coat 104 (e.g., at least 60% by volume of the bond coat 104 may comprise mullite). In particular embodiments, the bond coat 104 may include 60% to 98% by volume of the matrix phase (e.g., mullite), such as 65% to 96% by volume matrix phase (e.g., mullite), such as 75% to 95% by volume matrix phase (e.g., mullite).

Conversely, the oxygen getter of the discrete particles 110 is included in the bond coat 104 in an amount sufficient to serve as oxygen getter to inhibit oxygen from reaching the underlying substrate 102. In one particular embodiment, the oxygen getter may be formed from silicon metal (i.e., elemental silicon), a silicon alloy (e.g., a silicon eutectic alloy), a silicide, or mixtures thereof. As such, the oxygen getter may melt when the bond coat 104 reaches temperatures of about 1400° C. to about 2550° C., depending on the composition of the oxygen getter. In some embodiments, the matrix phase 112 comprises mullite and has a melting point of about 1825° C. to 1890° C. Under some circumstances, the temperature of the bond coat 104 can be above the melting point of the oxygen getter but below the melting point of the matrix phase 112, so that the oxygen getter becomes molten. For example, the oxygen getter may have at a melting temperature of about 1414° C. (i.e., the melting point of elemental silicon) to about 1485° C. In particular embodiments, the oxygen getter may be formed from a silicon material that is molten at a bond coat temperature of 1415° C., 1450° C., 1550° C., and/or 1600° C.

For example, the bond coat 104 may, in certain embodiments, include 2% to 40% by volume of the discrete particles 110 (i.e., the total volume of the mixture of the oxygen getter and the transition metal oxide), such as 4% to 35% by volume of the discrete particles 110 (e.g., 5% to 25% by volume of the discrete particles 110).

In certain embodiments, a silicide having a melting point of about 1900° C. or less (e.g., about 1400° C. to about 1900° C.) may also be in the discrete particles 110 as an oxygen getter. Determining the melting point of a particular silicide may be easily achieved using Si phase diagrams.

In particular embodiments, the oxygen getter within the discrete particles may have minimal thermal expansion coefficient mismatch with the substrate and mullite (e.g., no more than about 2-3 ppm per ° C.) to avoid matrix cracks. However, those skilled in the art know that a larger expansion coefficient mismatch can be accommodated by reducing the volume fraction of the getter phase. In another particular embodiment, the oxygen getter should have minimal volume increase on oxidation (e.g., no more than 150%, preferably no more than 100%, and more preferably a volume reduction on oxidation rather than a volume expansion) to reduce the stresses in the mullite layer and its cracking. Many embodiments of the discrete particles are possible that satisfy the requirements for the expansion coefficient mismatch and the volume change on oxidation. In one embodiment, the oxygen getter comprises elemental silicon, and may be pure elemental silicon. In another embodiment, the oxygen getter comprises a silicon alloy and/or a silicide. In the embodiment where the oxygen getter includes elemental silicon, then the bond coat may be referred to as a "mullite/Si bond coat." Silicon oxidation causes a volume expansion of about 115% to about 130% when it forms amorphous silica and a volume expansion of about 85% when it forms crystalline silica. However, the oxidation product is invariably amorphous first, which can then become crystalline with time.

Other embodiments of oxygen getters may include, but are not limited to, nickel, cobalt, chromium, or mixtures thereof. These oxygen getters may also be used in particular embodiments with silicon, a silicon alloy, and/or a silicide. For example, nickel has a much higher expansion mismatch (almost 8 ppm per ° C.) with the substrate and mullite. Therefore, the maximum volume fraction of nickel that can be tolerated would be lower than that of silicon which has a mismatch of less than 1 ppm per ° C. However, nickel has a volume expansion on oxidation of about 65% compared to about 115% to about 130% for silicon converting to amorphous silica. Chromium, on the other hand, has a lower expansion mismatch with the substrate and mullite than does nickel. It also has a higher melting temperature (1907° C.) compared to silicon (1410° C.) and nickel (1455° C.).

The matrix phase 112 may comprise an oxide material, particularly oxide materials having a melting temperature that is greater than the melting temperature of the oxygen getter. Additionally, the matrix phase 112 may comprise an oxide material that is generally unreactive with the oxygen getter of the discrete particles 110, even at elevated operating temperatures. In one particular embodiment, the matrix phase 112 is formed from crystallized mullite having a melting temperature that is greater than the melting temperature of the oxygen getter. In particular embodiments, the mullite has a melting temperature that is about 1825° C. to 1890° C., and is generally unreactive with the oxygen getter and/or the transition metal oxide of the discrete particles 110.

In one embodiment, the matrix phase 112 may include mullite having an excess of alumina, up to about 10 mole % of excess alumina. For example, the matrix phase 112 may include mullite formed from alumina and silica in a stoichiometric ratio of about 3 to 2 up to about 3.5 to 2 or in a stoichiometric ratio of about 2 to 1 up to about 2.25 to 1. In another embodiment, the matrix phase 112 may include mullite containing an excess of silica.

Mullite generally has a relatively slow diffusion rate for oxygen at all temperatures of interest, even up to 1650° C. (e.g., 1200° C. to 1650° C.). At temperatures over 1200° C., it is believed that the only other crystalline oxide that has lower oxygen diffusion rate than mullite is alumina, which has a very high expansion coefficient compared to the substrate and cannot be deposited as dense coatings without spallation. Although mullite has a coefficient of thermal expansion ("CTE") that is similar to that of SiC CMC substrates 102, the CTE of mullite is not an exact match to SiC. The slight mismatch of CTE of mullite and SiC could lead to problems related to thermal expansion, such as cracking and/or delamination, if the bond coat 104 is too thick. For example, it is believed that a bond coat 104 having a thickness of 20 mils (i.e., 508 μm) would lead to problems related to the CTE mismatch after repeated exposure to the operating temperatures. On the other hand, it is believed that a bond coat 104 having a maximum thickness of 15 mils or less, such as 1 mil to 15 mils (i.e., 381 μm or less, such as 25.4 μm to 381 μm), would survive such operating temperatures without significant problems from the CTE mismatch. In one particular embodiment, the bond coat 104 has a maximum thickness of 10 mils, such as 3 mils to 10 mils (i.e., 127 μm, such as 76.2 μm to 254 μm).

As stated, the combination of the oxygen getter and the transition metal oxide in the mullite-based matrix phase leads to a bond coat having a relatively low porosity. In one embodiment, the bond coat has a porosity that is less than 15%, such as measured according to ASTM E2109-01.

In one particular embodiment, the substrate 102 is formed from a ceramic matrix composite ("CMC") material. As used herein, ceramic-matrix-composite or "CMC" refers to a class of materials that include a reinforcing material (e.g., reinforcing fibers) surrounded by a ceramic matrix phase. Generally, the reinforcing fibers provide structural integrity to the ceramic matrix. Some examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) may also be included within the CMC matrix.

Some examples of reinforcing fibers of CMCs can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Generally, particular CMCs may be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs may be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain embodiments, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

As used herein, environmental-barrier-coating or "EBCs" refers to a coating system comprising one or more layers of ceramic materials, each of which provides specific or multi-functional protections to the underlying CMC. EBCs generally include a plurality of layers, such as rare earth silicate coatings (e.g., rare earth disilicates such as slurry or APS-deposited yttrium ytterbium disilicate (YbYDS)), alkaline earth aluminosilicates (e.g., comprising barium-strontium-aluminum silicate (BSAS), such as having a range of BaO, SrO, $Al_2O_3$, and/or $SiO_2$ compositions), hermetic layers (e.g., a rare earth disilicate), and/or outer coatings (e.g., comprising a rare earth monosilicate, such as slurry or APS-deposited yttrium monosilicate (YMS)). One or more layers may be doped as desired, and the EBC may also be coated with an abradable coating.

As stated above, the bond coat 104 may be used in conjunction with an EBC 108 to form a coated component 100 with an increased operating temperature compared to that using only a silicon bond coat (without the matrix phase). The EBC 108 may include any combination of one or more layers formed from materials selected from typical EBC or thermal barrier coating ("TBC") layer chemistries, including but not limited to rare earth silicates (e.g., monosilicates and di-silicates), aluminosilicates (e.g., mullite, barium strontium aluminosilicate (BSAS), rare earth aluminosilicates, etc.), hafnia, zirconia, stabilized hafnia, stabilized zirconia, rare earth hafnates, rare earth zirconates, rare earth gallium oxide, etc. The EBC may include a hafnia layer, an alumina layer, or both. Alternatively or additionally, the EBC may include a rare earth disilicate layer, a rare earth monosilicate layer, or both.

The EBC 108 may be formed from a plurality of individual layers 114. In the embodiments shown, EBC 108 includes a hermetic layer 116 positioned in directly on the bond coat 104 so as to encase the oxygen getter of the discrete particles 110, upon melting, within the bond coat 104. In one embodiment, this hermetic layer is of mullite, up to 2 mil thick, such as preferably about 0.1 mil to about 1 mil thick (e.g., about 0.1 mil to about 0.5 mil thick). Since the oxygen getter of the discrete particles 110 is reactive with oxygen (e.g., to form silicon oxide), there are minimal gaseous oxides produced (e.g., carbon oxides) upon exposure of the component 100 to oxygen at operating temperatures. Thus, there is no need for a gas escape layer through the bond coat 104, and the hermetic layer may be included within the EBC 108. It is even desirable to have a hermetic layer to prevent the ingress of water vapor to the bond coat 104. In one embodiment, the hermetic layer 116 may be positioned directly on the bond coat 104, but it may also be positioned elsewhere within the EBC 108.

The coated component 100 is particularly suitable for use as a component found in high temperature environments, such as those present in gas turbine engines, for example, combustor components, turbine blades, shrouds, nozzles, heat shields, and vanes. In particular, the coated component 100 may be a CMC component positioned within a hot gas flow path of the gas turbine such that the coating system 106 forms an environmental barrier for the underlying substrate 102 to protect the component 100 within the gas turbine when exposed to the hot gas flow path. In certain embodiments, the bond coat 104 is configured such that the coated component 100 is exposed to operating temperatures of about 1475° C. to about 1650° C., while the bond coat 104 remains substantially unaffected by these operating temperatures. Thus, the bond coat 104 may withstand exposure to operating temperatures of about 1475° C. to about 1650° C.

Figure 3:
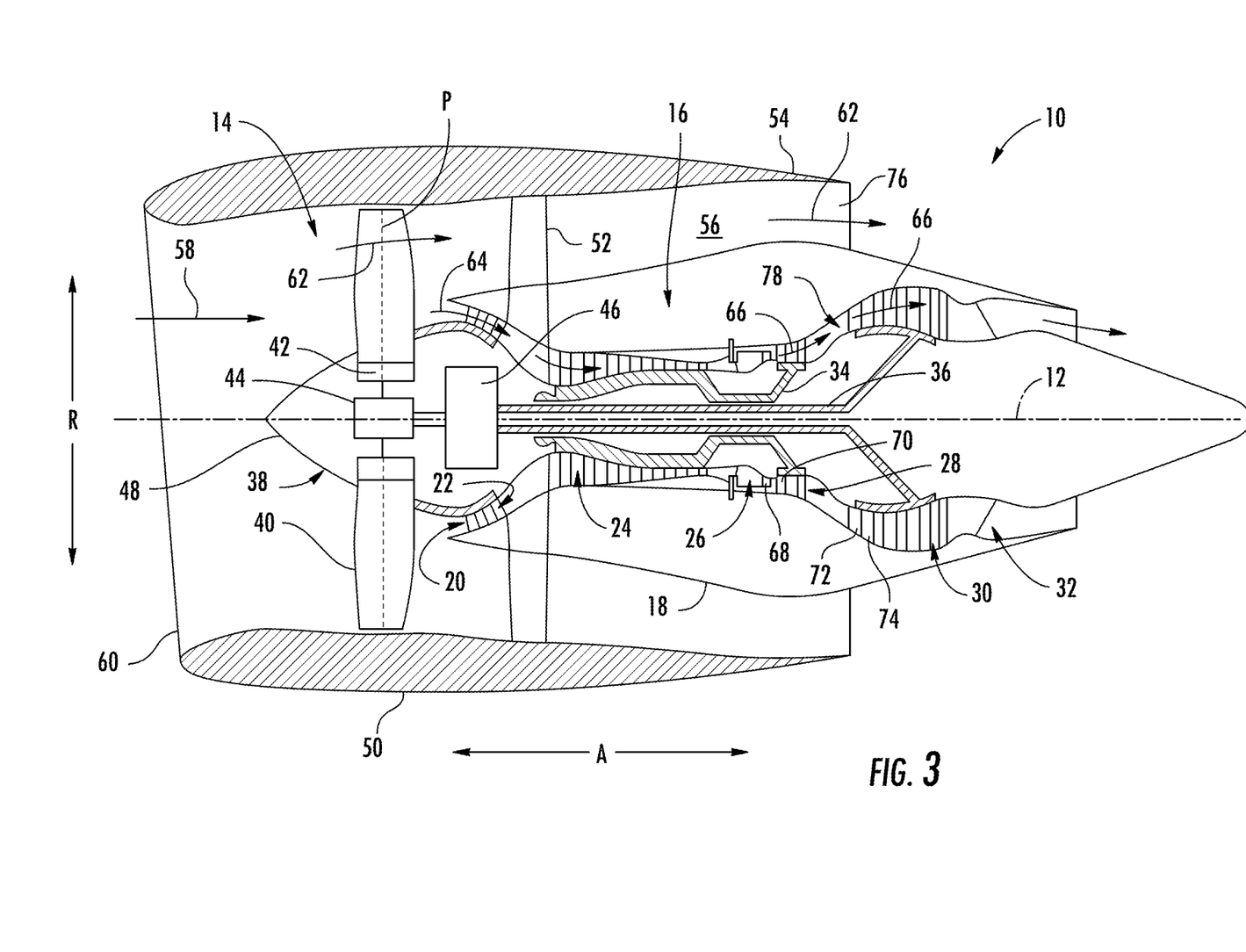
FIG. 3 is a schematic cross-sectional view of an exemplary gas turbine engine according to various embodiments of the present subject matter.

FIG. 3 is a schematic cross-sectional view of a gas turbine engine in accordance with an exemplary embodiment of the present disclosure. More particularly, for the embodiment of FIG. 3, the gas turbine engine is a high-bypass turbofan jet engine 10, referred to herein as "turbofan engine 10." As shown in FIG. 3, the turbofan engine 10 defines an axial direction A (extending parallel to a longitudinal axis 12 provided for reference) and a radial direction R. In general, the turbofan engine 10 includes a fan section 14 and a core turbine engine 16 disposed downstream from the fan section 14. Although described below with reference to a turbofan engine 10, the present disclosure is applicable to turbomachinery in general, including turbojet, turboprop and turboshaft gas turbine engines, including industrial and marine gas turbine engines and auxiliary power units. It is also applicable to other high temperature applications that contain water vapor in the gas phase, such as those arising from combustion of hydrocarbon fuels.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) spool or shaft 34 drivingly connects the HP turbine 28 to the HP compressor 24. A low pressure (LP) spool or shaft 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across an optional power gear box 46. The power gear box 46 includes a plurality of gears for stepping down the rotational speed of the LP shaft 36 to a more efficient rotational fan speed.

Referring still to the exemplary embodiment of FIG. 3, the disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan engine 10 through an associated inlet 60 of the nacelle 50 and/or fan section 14. As the volume of air 58 passes across the fan blades 40, a first portion of the air as indicated by arrows 62 is directed or routed into the bypass airflow passage 56 and a second portion of the air as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP spool or shaft 34, thus causing the HP spool or shaft 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP spool or shaft 36, thus causing the LP spool or shaft 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan engine 10, also providing propulsive thrust. The HP turbine 28, the LP turbine 30, and the jet exhaust nozzle section 32 at least partially define a hot gas path 78 for routing the combustion gases 66 through the core turbine engine 16.

Figure 4:
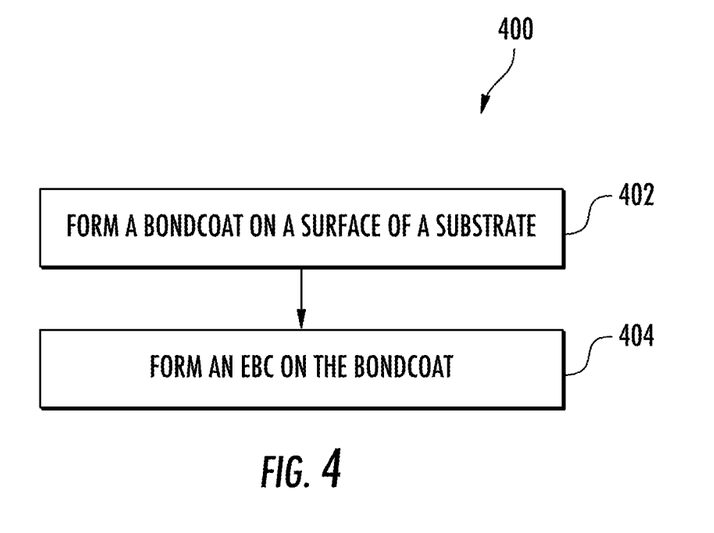
FIG. 4 is a flow chart diagram of an exemplary method of forming coated component having a bond coat formed from a matrix having discrete particles dispersed therein.

Methods are also generally provided for coating a ceramic component. For example, FIG. 4 shows a diagram of an exemplary method 400 of forming a coating system on a surface of a substrate. At 402, a bond coat is formed on the surface of the substrate to include discrete particles contained within a matrix phase, such as described above with respect to bond coat 104. In one embodiment, the bond coat is formed by air plasma spray. In another embodiment, it is formed by suspension plasma spray where a liquid suspension of the desired chemistry is used for air plasma spray. In still another embodiment, the coating is formed by low pressure plasma spray. In yet another embodiment one or more of the coated layers may be formed by a slurry coating process followed by sintering of the layer. Different coating layers may be formed by one or more of these processes.

At 404, an environmental barrier coating (EBC) is formed on the bond coat. As described above, the discrete particles, when melted, is contained within matrix phase between the surface of the substrate and an inner surface of the environmental barrier coating.

EXAMPLES

Exemplary bond coat materials were prepared using a mixture of an oxygen getter and a transition metal oxide dispersed within a continuous mullite phase, and a comparative bond coat materials were prepared without the transition metal oxide.

Figure 5:
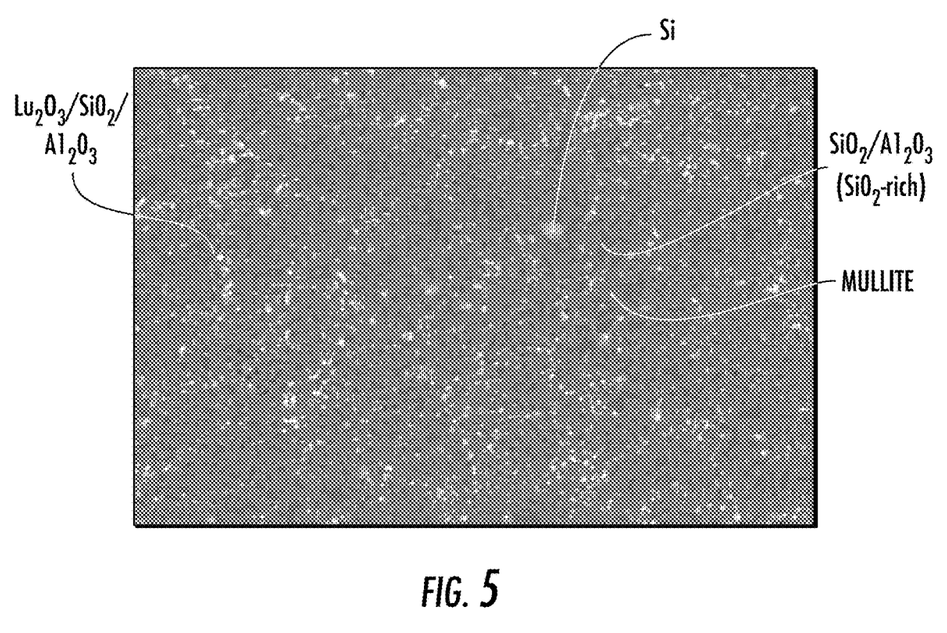
FIG. 5 shows a cross-sectional picture of an exemplary bond coat formed according to the examples discussed in greater detail below.

FIG. 5 shows a picture of a pellet containing an exemplary bond coat material after heat testing. The pellet containing an exemplary bond coat material was formed from 75.5 wt. % of mullite as the matrix material, 12.7 wt. % of $Al_2O_3$ to make the mullite aluminum-rich, 9.6 wt. % of elemental silicon as the oxygen getter, and 2.1 wt. % of $Lu_2O_3$ as the transition metal oxide. The exemplary bond coat material was formed by cold pressing a powder mixture of mullite, $Al_2O_3$, silicon, and $Lu_2O_3$ into a pellet, followed by pressure-less sintering. This bond coat material served as an exemplary bond coat material, even though it is not a coating. The pellet was then subjected to heat testing at a temperature of 1480° C. to 1540° C. in air for 10 hours to determine if porosity within the layer would be created. As shown, the porosity within the pellet has been substantially eliminated, even following the heat testing.

Figure 6:
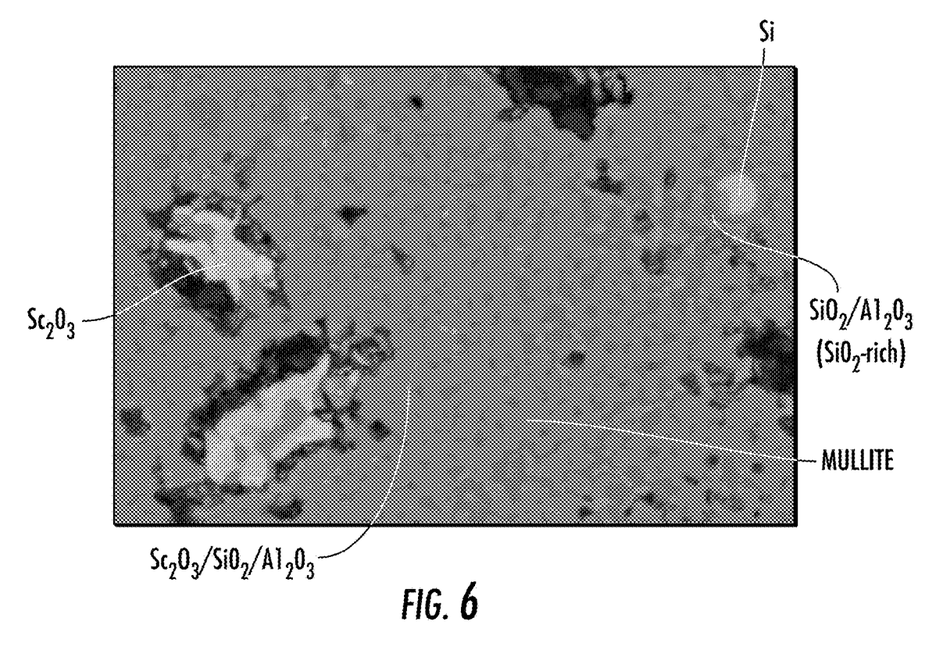
FIG. 6 shows a cross-sectional picture of an exemplary bond coat formed according to the examples discussed in greater detail below.

FIG. 6 shows a picture of a pellet containing an exemplary bond coat material after heat testing. The pellet containing an exemplary bond coat material was formed from 76.6 wt. % of mullite as the matrix material, 12.9 wt. % of $Al_2O_3$ to make the mullite aluminum-rich, 9.8 wt. % of elemental silicon as the oxygen getter, and 0.7 wt. % of $Sc_2O_3$ as the transition metal oxide. The exemplary bond coat material was formed by cold pressing a powder mixture of mullite, $Al_2O_3$, silicon, and $Sc_2O_3$ into a pellet, followed by pressure-less sintering. This bond coat material served as an exemplary bond coat material, even though it is not a coating. The pellet was then subjected to heat testing at a temperature of 1480° C. to 1540° C. in air for 10 hours to determine if porosity within the layer would be created. As shown, the porosity within the pellet is extremely small, even following the heat testing.

Figure 7:
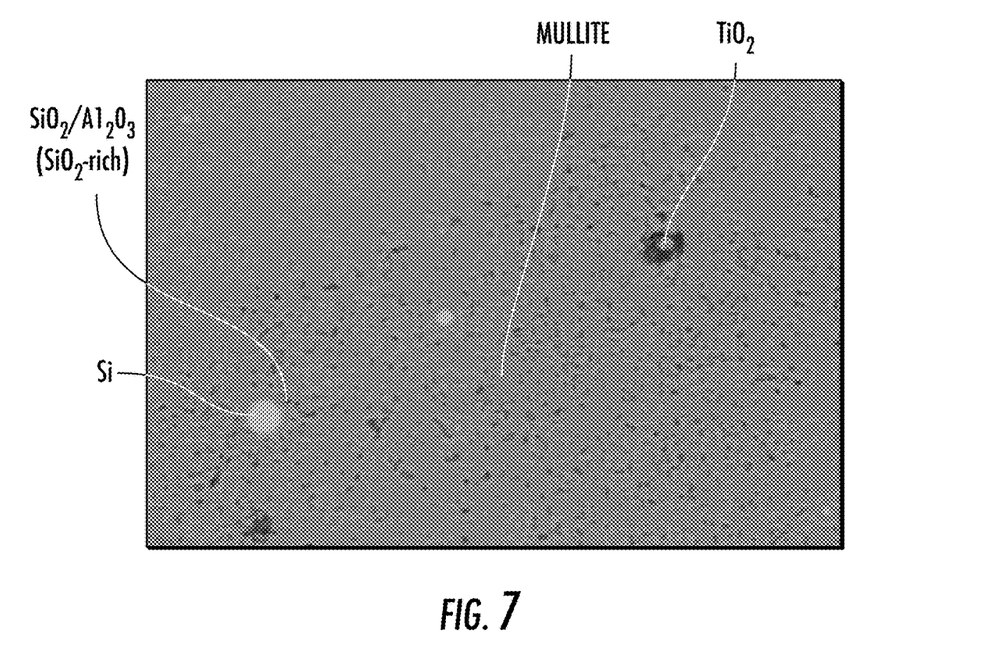
FIG. 7 shows a cross-sectional picture of an exemplary bond coat formed according to the examples discussed in greater detail below.

FIG. 7 shows a picture of a pellet containing an exemplary bond coat material after heat testing. The pellet containing an exemplary bond coat material was formed from 76.5 wt. % of mullite as the matrix material, 12.8 wt. % of $Al_2O_3$ to make the mullite aluminum-rich, 9.8 wt. % of elemental silicon as the oxygen getter, and 0.9 wt. % of $TiO_2$ as the transition metal oxide. The exemplary bond coat material was formed by cold pressing a powder mixture of mullite, $Al_2O_3$, silicon, and $TiO_2$ into a pellet, followed by pressure-less sintering. This bond coat material served as an exemplary bond coat material, even though it is not a coating. The pellet was then subjected to heat testing at a temperature of 1480° C. to 1540° C. in air for 10 hours to determine if porosity within the layer would be created. As shown, the porosity within the pellet is extremely small, even following the heat testing.

Figure 8:
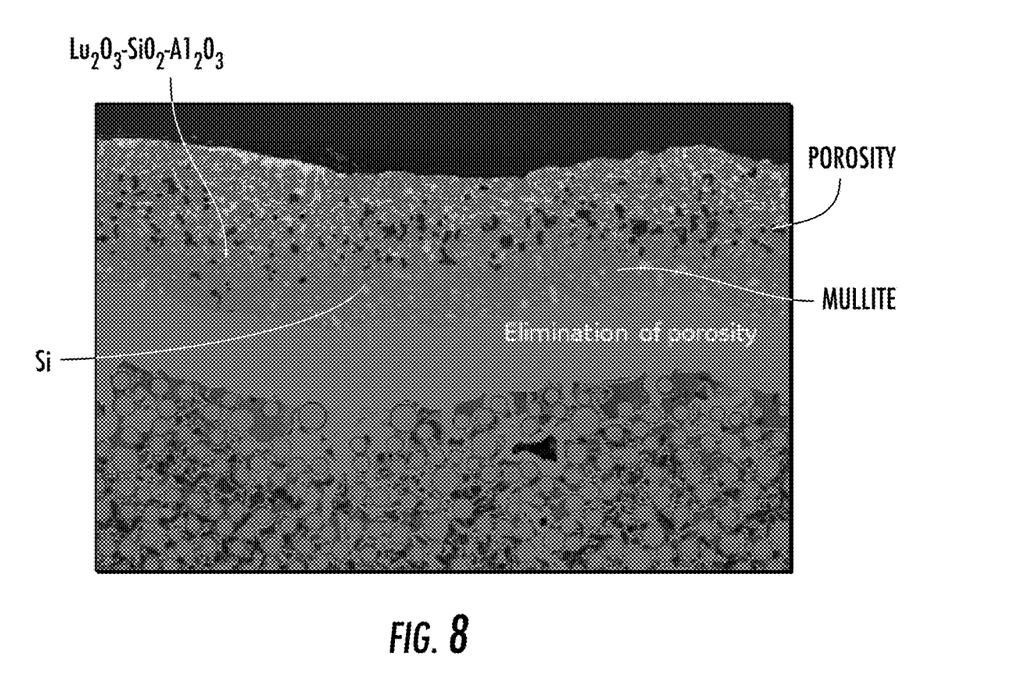
FIG. 8 shows a cross-sectional picture of an exemplary bond coat formed according to the examples discussed in greater detail below.

FIG. 8 shows a cross-sectional picture of an exemplary bond coat material after heat testing. The exemplary bond coat material was formed via solution plasma spraying of 85 vol. % of mullite as the matrix material, 10 wt. % of $Al_2O_3$ (compared to the total weight of the mullite and silicon) to make the mullite aluminum-rich, 15 vol. % of elemental silicon as the oxygen getter, and 3.2 wt. % of $Lu_2Si_2O_7$ (compared to the total weight of the mullite and silicon) as the transition metal oxide. The solids fractions for the solution plasma spray were: 77 wt % of mullite, 11 wt % of Si, 9 wt % of $Al_2O_3$, and 3 wt % of $Lu_2Si_2O_7$. The coating was then subjected to heat testing at a temperature of 1540° C. in air for 10 hours to determine if porosity within the layer would be created. As shown, the porosity within the bond coat was virtually eliminated, even following the heat testing.

Figure 9:
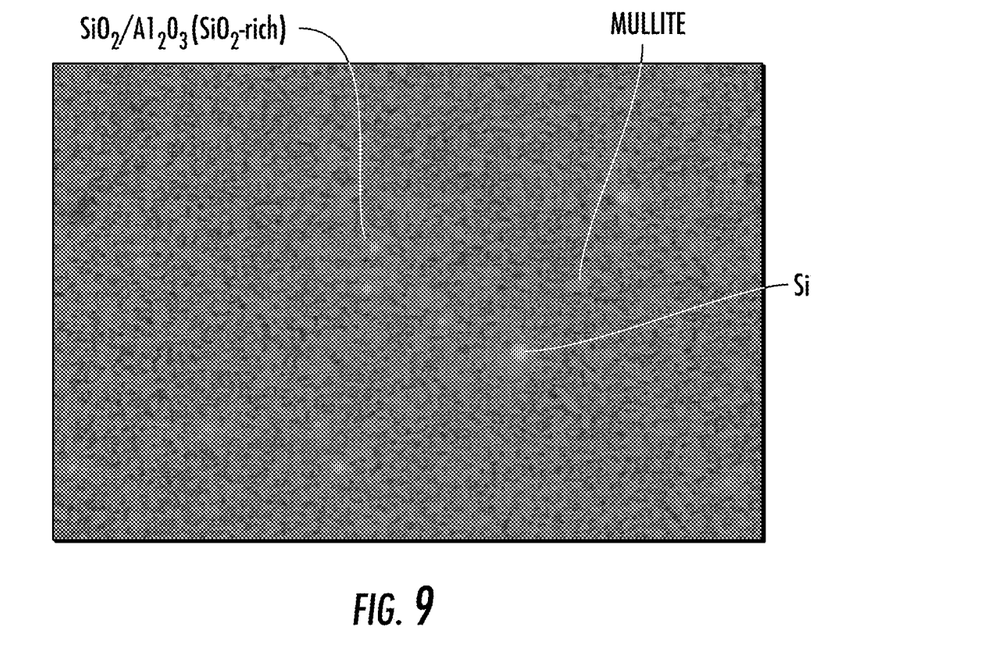
FIG. 9 shows a cross-sectional picture of a comparative bond coat formed according to the examples discussed in greater detail below.

FIG. 9 shows a picture of a pellet containing a comparative bond coat material, without any transition metal oxide present, after heat testing. The pellet containing the comparative bond coat material was formed from 77.1 wt. % of mullite as the matrix material, 13 wt. % of $Al_2O_3$ to make the mullite aluminum-rich, and 9.9 wt. % of elemental silicon as the oxygen getter. The comparative bond coat material was formed by cold pressing a powder mixture of mullite, $Al_2O_3$, and silicon into a pellet, followed by pressure-less sintering. This comparative bond coat material was formed in the same manner as was the pellets described above with respect to FIGS. 5, 6, and 7, but without any transition metal oxide present. The pellet was then subjected to heat testing at a temperature of 1480° C. to 1540° C. in air for 10 hours to determine if porosity within the layer would be created. As shown in FIG. 9, there is significant open porosity within the comparative pellet following the heat testing.

Figure 10:
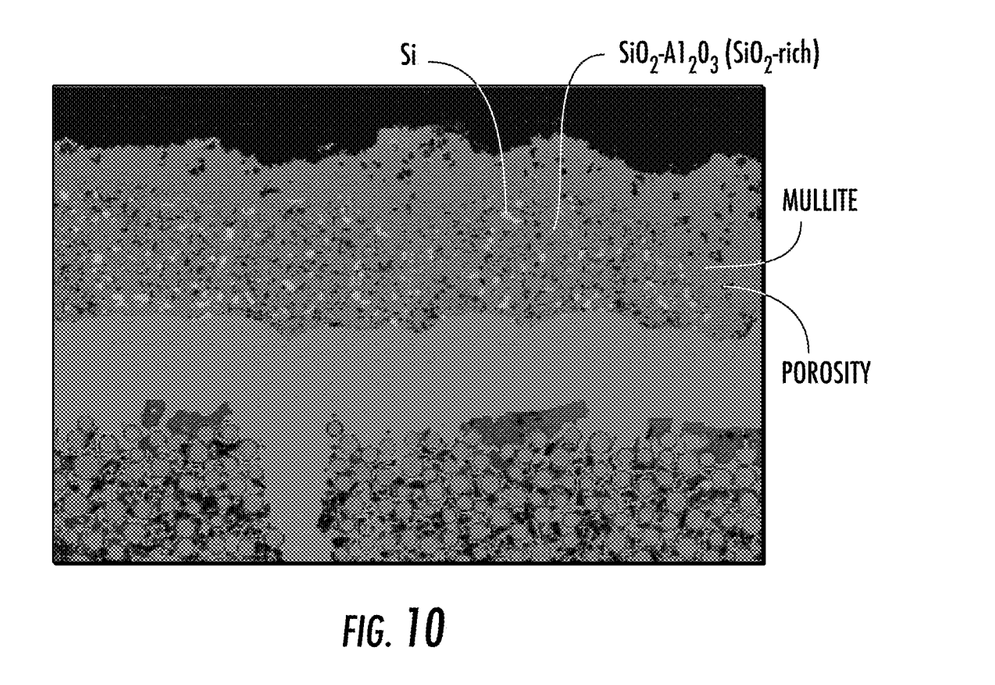
FIG. 10 shows a cross-sectional picture of another comparative bond coat formed discussed in greater detail below.

FIG. 10 shows a cross-sectional picture of a comparative bond coat material after heat testing. The comparative bond coat material was formed via solution plasma spraying of 85 vol. % of mullite as the matrix material, 10 wt. % of $Al_2O_3$ (compared to the total weight of the mullite and silicon) to make the mullite aluminum-rich, and 15 vol. % of elemental silicon as the oxygen getter. The solution plasma spray solids fraction was 79 wt % of mullite, 12 wt % of Si, and 9 wt % of $Al_2O_3$. This comparative bond coat was formed in the same manner as was the coating described above with respect to FIG. 8 but without any transition metal oxide present. The coating was then subjected to heat testing at a temperature of 1540° C. in air for 10 hours to determine if porosity within the layer would be created. As shown, the porosity within the bond coat was much greater than that shown in the exemplary bond coat of FIG. 8 following the heat testing.

Aspects of the present disclosure prevent water permeation by removing open porosity in the EBC through the formation of a dense mullite layer without incurring a significant penalty in high and low temperature oxidation life.

Further aspects of the invention are provided by the subject matter of the following clauses:

A coated component comprising: a ceramic matrix composite substrate comprising silicon carbide and having a surface; a bond coat on the surface of the substrate, wherein the bond coat comprises a plurality of discrete particles dispersed within a matrix phase, wherein the plurality of discrete particles comprises an oxygen getter and a transition metal oxide, and wherein the matrix phase comprises mullite; and an environmental barrier coating on the bond coat.

The coated component as in any preceding clause, wherein the transition metal oxide comprises $Y_2O_3$, $Lu_2O_3$, $Sc_2O_3$, $TiO_2$, $Ta_2O_5$, $La_2O_3$, $CeO_2$, or mixtures thereof.

The coated component as in any preceding clause, wherein the bond coat includes 0.1% by weight to 10% by weight of the transition metal oxide.

The coated component as in any preceding clause, wherein the bond coat has a porosity that is less than 15%.

The coated component as in any preceding clause, wherein the oxygen getter forms first discrete particles in the plurality of discrete particles and the transition metal oxide forms second discrete particles in the plurality of discrete particles.

The coated component as in any preceding clause, wherein the oxygen getter comprises elemental silicon, a silicon alloy, a silicide, or a mixture thereof.

The coated component as in any preceding clause, wherein the oxygen getter comprises elemental silicon.

The coated component as in any preceding clause, wherein the bond coat includes 1% by weight to 30% by weight of the oxygen getter.

The coated component as in any preceding clause, wherein the matrix phase is a continuous phase, and wherein the matrix phase spans the bond coat and is bonded directly to the surface of the substrate and to an inner surface of the environmental barrier coating.

The coated component as in any preceding clause, wherein the matrix phase defines 60% to 98% by volume of the bond coat.

The coated component as in any preceding clause, wherein the matrix phase defines 65% to 96% by volume of the bond coat.

The coated component as in any preceding clause, wherein the matrix phase defines 75% to 95% by volume of the bond coat.

The coated component as in any preceding clause, wherein the matrix phase consists essentially of mullite.

The coated component as in any preceding clause, wherein the environmental barrier coating comprises a plurality of layers with at least one of the layers of the environmental barrier coating comprises a hermetic layer.

The coated component as in any preceding clause, wherein the hermetic layer is adjacent to the bond coat such that the hermetic layer defines an inner surface of the environmental barrier coating.

The coated component as in any preceding clause, wherein the bond coat is configured to withstand exposure to operating temperatures of 1475° C. to 1650° C.

The coated component as in any preceding clause, wherein the environmental barrier coating comprises a hafnia layer, an alumina layer, or both.

The coated component as in any preceding clause, wherein the environmental barrier coating comprises a rare earth disilicate layer, a rare earth monosilicate layer, or both.

A method of forming the coated component of any preceding clause.

A method of forming a coated component, the method comprising: forming a bond coat on the surface of the substrate, wherein the bond coat comprises a plurality of discrete particles dispersed within a matrix phase, wherein the plurality of discrete particles comprises an oxygen getter and a transition metal oxide, and wherein the matrix phase comprises mullite; and forming an environmental barrier coating on the bond coat such that the plurality of discrete particles, when melted, are contained within matrix phase between the surface of the substrate and an inner surface of the environmental barrier coating.

The method as in any preceding clause, wherein the transition metal oxide comprises $Y_2O_3$, $Lu_2O_3$, $Sc_2O_3$, $TiO_2$, $Ta_2O_5$, $La_2O_3$, $CeO_2$, or mixtures thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A coated component, comprising:
    a ceramic matrix composite substrate comprising silicon carbide and having a surface;
    a bond coat on the surface of the ceramic matrix composite substrate, wherein the bond coat comprises a plurality of discrete particles dispersed within a matrix phase, wherein the plurality of discrete particles comprises an oxygen getter and a transition metal oxide in the form of an aluminate-transition metal oxide complex, and wherein the matrix phase comprises mullite; and
    an environmental barrier coating on the bond coat.

2. The coated component as in claim 1, wherein the transition metal oxide comprises $Y_2O_3$, $Lu_2O_3$, $Sc_2O_3$, $TiO_2$, $Ta_2O_5$, $La_2O_3$, $CeO_2$, or mixtures thereof.

3. The coated component as in claim 1, wherein the bond coat includes 0.1% by weight to 10% by weight of the transition metal oxide.

4. The coated component as in claim 1, wherein the bond coat has a porosity that is less than 15%.

5. The coated component as in claim 1, wherein the oxygen getter forms first discrete particles in the plurality of discrete particles and the transition metal oxide forms second discrete particles in the plurality of discrete particles.

6. The coated component as in claim 1, wherein the oxygen getter comprises elemental silicon, a silicon alloy, a silicide, or a mixture thereof.

7. The coated component as in claim 1, wherein the oxygen getter comprises elemental silicon.

8. The coated component as in claim 1, wherein the bond coat includes 1% by weight to 30% by weight of the oxygen getter.

9. The coated component as in claim 1, wherein the matrix phase is a continuous phase, and wherein the matrix phase spans the bond coat and bonds directly to the surface of the ceramic matrix composite substrate and to an inner surface of the environmental barrier coating.

10. The coated component as in claim 1, wherein the matrix phase defines 60% to 98% by volume of the bond coat.

11. The coated component as in claim 1, wherein the matrix phase defines 65% to 96% by volume of the bond coat.

12. The coated component as in claim 1, wherein the matrix phase defines 75% to 95% by volume of the bond coat.

13. The coated component as in claim 1, wherein the matrix phase consists essentially of mullite.

14. The coated component as in claim 1, wherein the environmental barrier coating comprises a plurality of layers with at least one of the layers of the environmental barrier coating comprises a hermetic layer.

15. The coated component as in claim 14, wherein the hermetic layer is adjacent to the bond coat such that the hermetic layer defines an inner surface of the environmental barrier coating.

16. The coated component as in claim 1, wherein the bond coat is configured to withstand exposure to operating temperatures of 1475° C. to 1650° C.

17. The coated component as in claim 1, wherein the environmental barrier coating comprises a hafnia layer, an alumina layer, or both.

18. The coated component as in claim 1, wherein the environmental barrier coating comprises a rare earth disilicate layer, a rare earth monosilicate layer, or both.

19. A method of forming a coated component, the method comprising:
    forming a bond coat on a surface of a substrate, wherein the bond coat comprises a plurality of discrete particles dispersed within a matrix phase, wherein the plurality of discrete particles comprises an oxygen getter and a transition metal oxide in the form of an aluminate-transition metal oxide complex, and wherein the matrix phase comprises mullite; and
    forming an environmental barrier coating on the bond coat such that the plurality of discrete particles, when melted, are contained within matrix phase between the surface of the substrate and an inner surface of the environmental barrier coating.

20. The method as in claim 19, wherein the transition metal oxide comprises $Y_2O_3$, $Lu_2O_3$, $Sc_2O_3$, $TiO_2$, $Ta_2O_5$, $La_2O_3$, $CeO_2$, or mixtures thereof.

\* \* \* \* \*